US009552379B2

(12) United States Patent
Pejathaya et al.

(10) Patent No.: US 9,552,379 B2
(45) Date of Patent: Jan. 24, 2017

(54) FOREIGN KEY IDENTIFICATION IN DATABASE MANAGEMENT SYSTEMS

(71) Applicant: Tata Consultancy Services Limited, Mumbai (IN)

(72) Inventors: Karandas Pejathaya, Pune (IN); Gopinath Talluri, Pune (IN); Anand Shankar Bhide, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 439 days.

(21) Appl. No.: 13/832,698

(22) Filed: Mar. 15, 2013

(65) Prior Publication Data
US 2014/0089255 A1    Mar. 27, 2014

(30) Foreign Application Priority Data
Sep. 26, 2012  (IN) .......................... 2811/MUM/2012

(51) Int. Cl.
*G06F 17/30*    (2006.01)
(52) U.S. Cl.
CPC ... *G06F 17/30289* (2013.01); *G06F 17/30306* (2013.01)
(58) Field of Classification Search
None
See application file for complete search history.

(56) References Cited

U.S. PATENT DOCUMENTS

| 6,092,061 | A | * | 7/2000 | Choy |
| 8,359,325 | B1 | * | 1/2013 | Gui et al. ...................... 707/760 |
| 2005/0055369 | A1 | * | 3/2005 | Gorelik et al. ............... 707/102 |
| 2006/0195437 | A1 | * | 8/2006 | Dietel .............................. 707/4 |
| 2007/0156736 | A1 | | 7/2007 | Bestgen et al. |
| 2008/0077570 | A1 | * | 3/2008 | Tang et al. ........................ 707/5 |

OTHER PUBLICATIONS

Zhang et al, "Automatic Discovery of Attributes in Relational Databases", SIGMOD'II, Jun. 12-16, 2011, Athens, Greece, Copyright 2011, ACM 978-1-4503-0661-4111/06.*

(Continued)

*Primary Examiner* — Stanley K Hill
*Assistant Examiner* — Ilya Traktovenko
(74) *Attorney, Agent, or Firm* — Schwegman Lundberg & Woessner, P.A.

(57) ABSTRACT

Systems and methods for foreign key identification are described. The method includes computing a threshold value for each of a primary key-foreign key (PK-FK) pair of a super-set of PK-FK, and generating a sub-set of PK-FK pairs based on comparison of the threshold value and a predefined threshold value. The predefined threshold value is indicative of an acceptance criterion. Further, the method includes determining a conformance score for each of the PK-FK pair of the subset of PK-FK pairs. The conformance score is based on deviations between Cumulative Probability Distribution (CPD) values of PK and CPD of FK for each PK-FK pair. Further, the method includes comparing the conformance score of the each PK-FK pair of the sub-set of PK-FK pairs with a predetermined acceptability index. The predetermined acceptability index is indicative of an acceptance of at least one positive FK from the set of PK-FK pairs.

7 Claims, 2 Drawing Sheets

(56) References Cited

OTHER PUBLICATIONS

Rostin et al, "A Machine Learning Approach to Foreign Key Discovery", 12th International Workshop on the Web and Dalabases (WebDB 2009).*

Zhang, Meihui, et al., "On Multi-Column Foreign Key Discovery", Infront—The 36th International Conference on Very Large Data Bases, Singapore, Proceedings of the VLDB Endowment, vol. 3, No. 1, (2010), 10 pgs.

"European Application Serial No. 13158973.1, European Search Report dated May 7, 2013", 5 pgs.

"European Application Serial No. 13158973.1, Response filed Oct. 2, 2014", 8 pgs.

Bahmani, Amir H., et al., "Automatic database normalization and primary key generation", Canadian Conference on Electrical and Computer Engineering, *CCECE 2008*, (2008), 11-16.

Wijsen, Jer, "On the consistent rewriting of conjunctive queries under primary key constraints", *Information Systems*, 24(7), (2009), 578-601.

* cited by examiner

FOREIGN KEY IDENTIFICATION IN DATABASE MANAGEMENT SYSTEMS

PRIORITY CLAIM TO RELATED APPLICATIONS

This application claims the benefit of priority to Indian Patent Application Serial Number 2811/MUM/2012, entitled "FOREIGN KEY IDENTIFICATION IN DATABASE MANAGEMENT SYSTEMS," filed on Sep. 26, 2012, the benefit of priority of which is claimed hereby, and which is incorporated by reference herein in its entirety.

FIELD OF INVENTION

The present subject matter relates to database management systems and, in particular, to identification of a foreign key in the database management systems.

BACKGROUND

A database usually refers to an organized collection of data. The database comprises collection of data records, files, and other objects. Generally, the database comprises multiple tables. Each table of the databases may comprise one or more fields. For example, a table for storing personal records of employees of an organization may have multiple fields, such as name, address, date of birth, mobile number, e-mail address, and emergency contact number. The record of each of the employees is stored in the table as a row. With time, values or other data type stored in the database may need to be updated, new records may need to be added, and old records may need to be deleted.

Generally, organizations may have multiple databases to facilitate its business operations and for use by various software applications. To ensure the quality of data in each database, a database management system (DBMS) is used. The DBMS is usually configured to maintain the accuracy, availability, usability, and resilience of the database(s). The DBMS controls the creation, maintenance, and/or use of the databases. Further, the DBMS facilitates concurrent access of the multiple databases by the software applications.

A type of DBMS that is based on a relation model is a relational database management system (RDBMS). In a relational model, the data and the relationships amongst the data are stored in the form of one or more table(s). The data can be accessed or reassembled in many different ways without having to change the table forms. Various conventionally known databases, such as MySQL®, and Sybase™, are based on the relational model. The RDBMS provides relational operators to manipulate the data stored in the tables. The tables in a database pertaining to the relational model may include a row of column names specifying one or more attribute fields, and zero or more data rows containing one scalar value for each of the attribute fields.

A conventional RDBMS is typically queried using structured query language (SQL) based queries received from various software applications or from a user. The query received from the user may identify a primary key (PK). The primary key of a table uniquely identifies each record in the table. The PK may be a single attribute or a combination of multiple attributes. Generally, a foreign key (FK) is an attribute of one table/data set that maps with PK of another table/data set to form a relationship between the two tables/data sets. In other words, A foreign key (FK) is an attribute(s) in a table in the database that matches with the attributes of the PK to form a relationship. This relationship is conventionally referred to as a Primary Key-Foreign Key (PK-FK) pair. The relationship identified as PK-FK pair is useful to relate and identify the relationship of one variable with another. The PK-FK pair relationship further helps to obtain the information requested by the user without going through the numerous tables, thus saving time and effort. However, identification of such PK-FK pair relationships in large scale databases containing hundreds of thousands of rows and columns is a processor-intensive, computationally-intensive process and may often lead to many false positives.

SUMMARY

This summary is provided to introduce concepts related to identification of a Foreign Key in one or more database systems. This summary is not intended to identify essential features of the claimed subject matter nor is it intended for use in determining or limiting the scope of the claimed subject matter.

In an embodiment, a method includes computing a threshold value for each of a primary key-foreign key (PK-FK) pair of a super-set of PK-FK, wherein the threshold value is based on a standard principle of FK column. Further, the method includes generating a sub-set of PK-FK pairs based on comparison of the threshold value and a predefined threshold value, where the subset of PK-FK pairs is a subset of the superset of PK-FK pairs, and where the predefined threshold value is indicative of an acceptance criterion. Furthermore, the method includes determining a conformance score for each of the PK-FK pair of the subset of PK-FK pairs, wherein the conformance score is based on deviations between Cumulative Probability Distribution (CPD) values of PK and CPD of FK for each PK-FK pair of the sub-set of PK-FK pairs. Further, the method includes comparing the conformance score of the each PK-FK pair of the sub-set of PK-FK pairs with a predetermined acceptability index, wherein the predetermined acceptability index is indicative of an acceptance of at least one positive FK from the set of PK-FK pairs.

BRIEF DESCRIPTION OF THE FIGURES

ThE detailed description is described with reference to the accompanying figure(s). In the figure(s), the left-most digit(s) of a reference number identifies the figure in which the reference number first appears. The use of the same reference number in different figure(s) indicates similar or identical items. The features, aspects and advantages of the subject matter will be better understood with regard to the following description, and the accompanying drawings.

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

Figure 1:
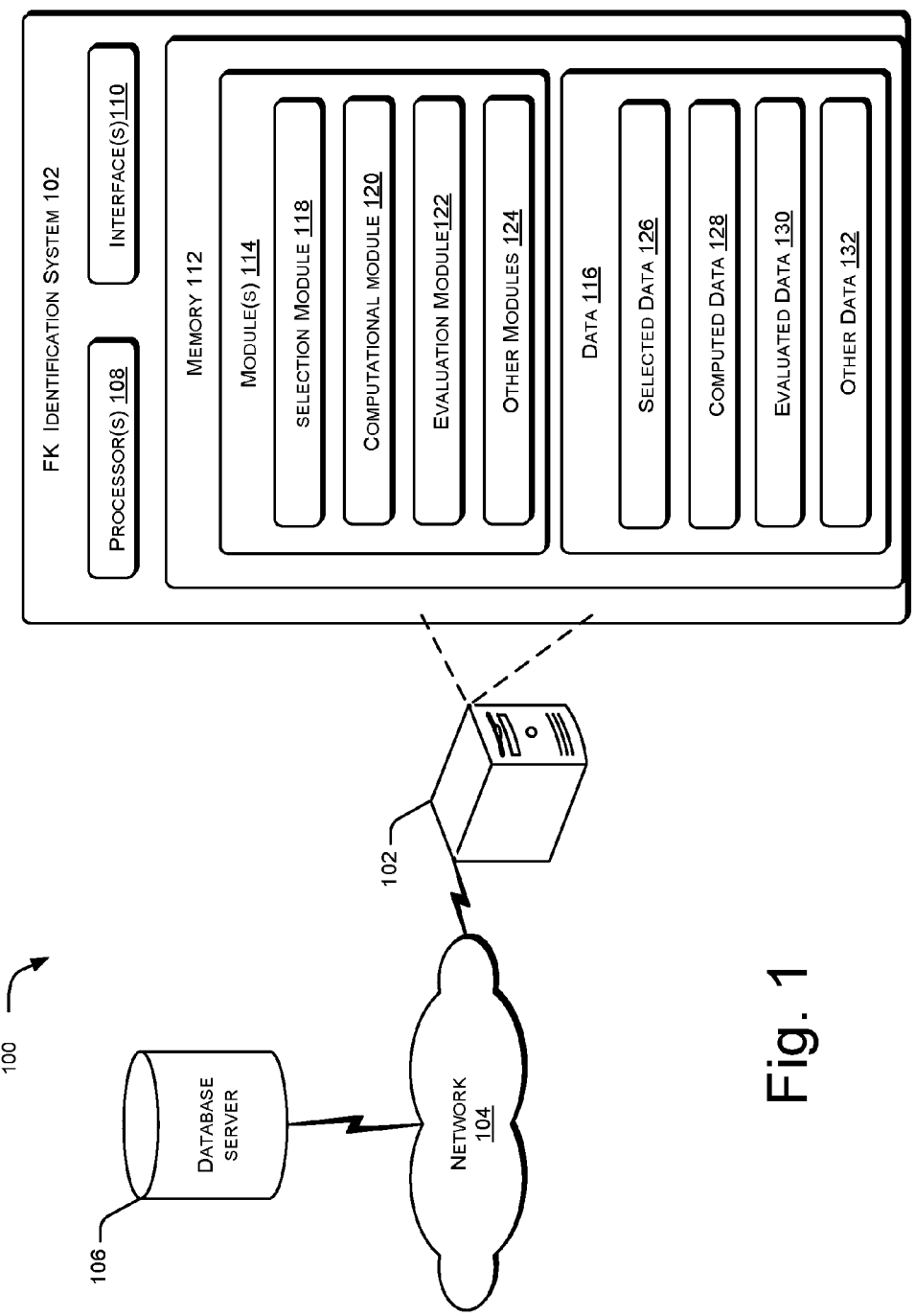
FIG. 1 illustrates an exemplary implementation of a foreign key identification system in a network environment, in accordance with an implementation of the present subject matter.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computer or a processor, whether or not such computer or processor is explicitly shown.

DETAILED DESCRIPTION

Systems and methods for identification of a foreign key (FK) in one or more database management systems (DBMS) are described herein. The systems and methods may be implemented in a variety of computing devices, such as laptops, desktops, workstations, tablet-PCs, smart phones, notebooks or portable computers, tablet computers, mainframe computers, mobile computing devices, entertainment devices, computing platforms, internet appliances, measurement devices, computing chips, integrated circuits, and similar systems. However, a person skilled in the art will comprehend that the embodiments of the present subject matter are not limited to any particular computing system, architecture or application device, as it may be adapted to take advantage of new computing system and platform as they become accessible.

A DBMS is a collection of programs that enable a user to store, modify, and extract information from one or more databases using database applications. Examples of database applications include computerized library systems, automated teller machines, online reservation systems; computerized parts inventory systems, e-ticketing systems, and so on. The technical implementations of the DBMS may vary to a great extent. The DBMS organizes information internally in one of a relation, network, flat and hierarchical format. A relational database management system (RDBMS) is a database management system (DBMS) that is based on the relational database model.

In the RDBMS, the data is structured in the form of database tables, fields, and records. Each table of the RDBMS comprises one or more database table rows/columns. Each database table row comprises one or more database table fields. The RDBMS stores the data into a collection of tables, which may be related by database table columns. The RDBMS also provides relational operators to manipulate the data stored into the database tables.

Further, a set of rules governs the construction of queries and is known as a query language. Most RDBMS use semi-standardized query language called SQL as database query language. For example, the query SELECT ALL WHERE NAME="JOHN" AND COUNTRY="INDIA" requests all records in which the NAME field is equal to JOHN and the COUNTRY field is equal to INDIA. The query identifies the primary key PK as, in the above example, NAME and COUNTRY, which forms the basis of identification of a foreign key FK, to form a positive PK-FK pair relationship to provide the desired results to the query.

The PK-FK relationship, attained by the identification of an FK for a PK, facilitates in identifying the relationship between different entities and understanding the business methods related to these entities. However, understanding the data flow and business methods is difficult as the PK-FK relationship information may not be specified at database metadata level, but is embedded in the logic of the software application. Further, since most of the software applications have inadequate documentation, the identification of useful PK-FK relationship becomes more difficult.

Conventional techniques for identification of an FK to form useful PK-FK relationships include matching of FK and PK column name and matching of the data along the FK and PK column. The conventional techniques, though simple, are not very effective and identify a large number of false positives PK-FK. For example, the conventional techniques may identify a number of technically feasible PK-FK pairs; however, they may not have any functional significance, resulting in a false positive PK-FK pair. If the conventional techniques are used in identification of PK-FK pair in a large database of a big/sizable/expanding organization, having millions of tables and rows, the number of false positive PK-FK pairs getting identified would be very high. Further, the identification of the FK to form a positive PK-FK pair may be error-prone and result in substantial wastage of time, energy, and resources. In order to make the identification of the FK to form maximum positive PK-FK relationships that have a functional significance, the number of false positives should be kept to a minimum.

The present subject matter discloses an FK identification system, which optimizes the identification of PK-FK relation. The FK identification system reduces the number of false positive in the identification of an FK to form positive PK-FK pairs by computing a conformance value for a subset of PK-FK pairs. The conformance value is obtained by computing score with respect to a range and a variation for the subset of PK-FK pairs. The conformance data analysis is done using a statistical function. The closer the score is to zero, the greater is the chances of the subset of PK-FK pairs constituting a positive PK-FK pair.

In an implementation, the FK identification system obtains the subset of PK-FK pairs by comparing a computed threshold vale for a superset of PK-FK pairs and a predefined threshold value. The computed threshold value is obtained by analyzing a data type and a length of the columns of the superset of PK-FK pairs.

In an implementation, the superset of PK-FK pairs is obtained by pairing all the known PKs to all the probable FKs. Based on an input from a user, a schema containing metadata from a database server is selected and is used to identify PK. Further, columns that cannot be part of FK are, based on standard rules, such as FK columns cannot be of type binary large object, character large object, and the likes, eliminated and the possible FKs selected are paired with the identified PKs to form a superset of PK-FK pairs, and for further identification of a subset of PK-FK pairs and formation of positive PK-FK pairs.

The above method(s) and system(s) are further described in conjunction with the following figures. It should be noted that the description and the figures merely illustrate the principles of the present subject matter. It will thus be appreciated that those skilled in the art will be able to devise various arrangements that, although not explicitly described or shown herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

It will also be appreciated by those skilled in the art that the words during, while, and when as used herein are not exact terms that mean an action takes place instantly upon an initiating action but that there may be some small but reasonable delay, such as a propagation delay, between the initial action and the reaction that is initiated by the initial action. Additionally, the word "connected" is used throughout for clarity of the description and can include either a direct connection or an indirect connection.

FIG. 1 illustrates a network environment 100 for implementing a foreign key identification system 102, according to an embodiment of the present subject matter. The foreign key identification system 102, hereinafter referred to as the FKI system 102, is configured to identify at least one foreign key (FK) to pair with a primary key (PK). The FKI system 102 is communicatively coupled to a database server 106. The FKI system 102 may be implemented in a computing device, such as a hand-held device, a laptop or other portable computer, a tablet computer, a mobile phone, a PDA, a smart-phone, and a desktop computer. The FKI system 102 may also be implemented in a workstation, a mainframe computer, a server, and a network server.

Although FIG. 1 depicts a database server 106, in an implementation, the FKI system 102 may be communicatively coupled to more than one database for the purpose of identification of the positive FK. The FKI system 102 may be connected to the database server 106 either directly or over a network, such as a network 104.

The network 104 may be a wireless or a wired network, or a combination thereof. In an example, the network 104 can be implemented as a computer network, as one of the different types of networks, such as intranet, local area network (LAN), wide area network (WAN), the internet, and such. The network 104 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 104 may include a variety of network devices, including routers, bridges, servers, computing devices, storage devices. The network devices within the network 104 may interact with the FKI system 102 and the database server 106 through communication links.

In another example, the network 104 can be implemented as a telecommunication network. In said example, the network 104 can be a collection of individual networks, interconnected with each other and functioning as a single large network (e.g., the internet or an intranet). Examples of such individual networks include, but are not limited to, Global System for Mobile Communication (GSM) network, Universal Mobile Telecommunications System (UMTS) network, Personal Communications Service (PCS) network, Time Division Multiple Access (TDMA) network, Code Division Multiple Access (CDMA) network, Next Generation Network (NGN), IP-based network, Public Switched Telephone Network (PSTN), and Integrated Services Digital Network (ISDN). Depending on the technology, the network 104 includes various network entities, such as gateways, routers; however, such details have been omitted for the sake of brevity. Further, in an example, the FKI system 102 can use General Packet Radio Service (GPRS) or Bluetooth for communicating with the database server 106. In yet another example, the network 104 can be implemented as a combination of a computer network as well as a telecommunication network.

In an implementation, the FKI system 102 includes one or more processor(s) 108 interface(s) 110, and a memory 112 coupled to the processor(s) 108. The interfaces 110 may include a variety of software and hardware interfaces, for example, interfaces for peripheral device(s), such as a keyboard, a mouse, an external memory, a camera device, and a printer. Further, the interfaces 110 may enable the FKI system 102 to communicate with other devices, such as web servers and external databases. The interfaces 110 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 110 may include one or more ports for connecting a number of computing systems with one another or to another server computer.

The processor(s) 108 can be a single processing unit or a number of units, all of which may include multiple computing units. The processor 108 may be implemented as one or more microprocessors, microcomputers, microcontrollers, digital signal processors, central processing units, state machines, logic circuitries, and/or any devices that manipulate signals based on operational instructions. Among other capabilities, the processor 108 is configured to fetch and execute computer-readable instructions and data stored in the memory 112.

The memory 112 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. The memory 112 also includes module(s) 114 and data 116.

The modules 114, amongst other things, include routines, programs, objects, components, data structures, etc., which perform particular tasks or implement particular abstract data types. In an implementation, the modules 114 further include a selection module 118, computational module 120, an evaluation module 122, and other module(s) 124. The other modules 124 may include programs that supplement applications on the FKI system 102, for example, programs in the operating system. On the other hand, the data 116 serves, amongst other things, as a repository for storing data processed, received, and generated by one or more of the modules 114. In an implementation, the data 116 includes selected data 126, computed data 128, evaluated data 130, and other data 132. The other data 132 may include data generated as a result of the execution of one or more modules in the other modules 124.

In an implementation, a user may access the FKI system 102 for the purpose of querying the database server 106 and an identifying FK in the database server 106. For the purposes of the description herein, the user may be understood as a professional who has skills and capability of operating a DBMS. In an implementation, the user may be an authentic user who is allowed to access the FKI system 102. In an implementation, the user is provided with a user interface, such as a graphic user interface (GUI), and a command-line access tool, which may be used for the purposes of querying the database server 106 and identification of the FK.

In one implementation, the user accessing the FKI system 102 queries the database server 106 via the selection module 118. The selection module 118 is configured to obtain PK based on rules, such as but not limiting to, unique value and non-empty value from the database server 106. The PK obtained is further utilized for identifying relationship between PK and FK and determining positive FK to form PK-FK pairs. In the said implementation, the selection module 118 identifies a schema containing metadata from the database server 106. The schema may be a structure of the database server 106 described in a formal language supported by the DBMS. Further the schema refers to the organization of data to create a blueprint of how the database server 106 is constructed, i.e., divided into database tables. The schema also specifies the data that can be received as an input into the database server 106. Further the selection module 118 is configured to select the PK based on the selected schema utilizing rules, such as unique value and non-empty value. The selected data of the schema and the PK is stored in the selected data 126.

Further, in said implementation, the selection module 118 is configured to eliminate columns which cannot be part of FK, from all the tables in the selected schema obtained from the selected data 126. The selection module 118 performs FK columns elimination based on standard rules. The standard rules may differ and are not limited to a single type of database. The standard rules may be, PK and FK Column data type should either be the same or should be of same type and PK and FK Column length should be same. For example, in one implementation the PK and FK column contain only text characters and in another implementation PK and FK column have 5000 rows. Further, the selection module 118 is configured to create pairs of the PK and FK. The PK-FK pairs so created represent a superset of PK-FK pairs. The superset of possible PK-FK pairs created by the selection module 118 is stored in the selected data 126. This data of superset of PK-FK pairs stored as the selected data 126 is used as an input by the computing module 120.

The process of identifying the FK may involve further analysis of thousands of rows of data and hence removal of false-positives FK results in use of less processing power, saving in time and effort. This process of elimination of false-positives FK from the superset of PK-FK pairs obtained from the selection module 118 and stored as the selected data 126 is done by computation of a threshold value and comparisons of the computed threshold value to a predefined threshold value. The threshold value computed by the evaluation module 122 is achieved by checking whether these pairs adhere to standard principles of FK column. In an example, the standard principle, such as but not limiting to, an FK has significant cardinality, a PK has a small percentage of its values outside the range of the FK, the FK has a good coverage of the PK, both FK and PK column names are similar. In one implementation, the computational module 120 may be configured to compute the threshold value using equation 1 depicted below.

$$\theta = [(F \cap P)/|P|]*100 \qquad \text{Equation (1)}$$

In the equation 1, P represents the Primary Key data, F represents the Foreign Key data, F∩P represents the number of rows common to both F and P, and |P| represents the distinct number of rows in P. The threshold value computed by the computational module 120 is stored in the computed data 128.

Further, the evaluation module 122 compares the threshold value obtained by the computational module 120 to the predefined threshold value, obtaining a percentage of values in P that are present in F. Further the predefined threshold value indicates the acceptance criterion of the PK-FK pair from the super-set of PK-FK pairs to form sub-set of PK-FK pairs. In one example, the evaluation module 122 provides as an output, a subset of PK-FK pairs that is stored in the evaluated data 130. The subset of PK-FK pairs stored in the evaluated data 130 is used as an input to the computational module 120 for computation of a conformance score. The conformance score is defined as a maximum difference between corresponding values of cumulative probability distribution (CPD) of PK and CPD of FK.

The computational module 120 is configured to use the subset of PK-FK pairs in the evaluated data 130 and obtain the CPD of the PK and the FK individually. The values in P are distinct, and the probability of each value in P is calculated using equation 2 depicted below.

$$P(i) = (1/N) \qquad \text{Equation 2.}$$

In equation 2, P represents PK column(s), and N represents the number of distinct rows of P. In one implementation, the computational module 120 may be configured to compute the CPD for PK using equation 3 depicted below.

$$P(i <= N) = \sum_{i=2}^{N} (P(i-1) + P(i)) \text{ For All } i > 1 \qquad \text{Equation 3}$$

In one embodiment, a LOG of PK values is taken for the X-Axis and the PK CPD values on the Y-Axis and a graph is plotted for all PKs. The computation of CFD for FK from the subset of PK-FK pairs differs from the computation of CFD for PK. The difference is that the FK is not distinct. The CPD for FK is calculated first by sorting the FKs. The sorted columns of FKs (single or multi) are denoted by equation 4 depicted below.

$$F = \{f_1, f_2, f_3, f_4 \ldots f_M\}. \qquad \text{Equation 4}$$

In equation 5, F represents FK column and M is Number of rows in F and M>>N. The probability for an individual FK value P ($F_i$) is computed as in equation 5 depicted below.

$$P(Fi) = (\text{Number of Occurrence of } F_i \text{ in } F)/(\text{Total Number of Rows in } F) \qquad \text{Equation 5}$$

In one implementation, the computing module 120 may be configured to compute the CPD for FK using equation 6 depicted below.

$$CPD[F_i \leq N] = \Sigma(P[F_{i-1}] + P[F_i]) \text{ where } i > 1. \qquad \text{Equation 6}$$

In one embodiment, LOG of FK values is taken for the X-Axis and the FK CPD values on the Y-Axis, for each distinct value of F∈P and a graph may be plotted for all FK.

The CPD calculated in the computational module 120 is stored in the computed data 128 and is used by the evaluation module 122 for the calculation of the conformance score based on Kolmogorov Smirnov Test and identification of the FK based on comparisons between a predetermined acceptability index and computed conformance scores. The conformance score is the maximum difference that exists between two corresponding values of the PK CPD and the FK CPD. Further, the conformance score is the maximum distance between the two step graphs when plotted graphically. The closer this score is to zero, the more accurate the distribution of the FK to the PK. Similarly, the more the value of the score is farther away from zero, the more the values in the FK column varying greatly with respect to the PK column and a probability of them constituting a positive PK-FK pair also decreasing. The evaluated data 130 and the identified FK to form a positive PK-FK pair is further stored in the evaluated data 130.

In one embodiment, the predefined acceptable conformance score for identifying FK is considered as 0.2. The calculated conformance score is compared by the evaluation module 122 to this predefined acceptable conformance score and the positive FKs are identified to pair with the known PKs to form positive PK-FK pairs and are stored in the evaluated data 130.

The FKI system 102 used for identification of the FKs to form positive PK-FK pairs is simple and robust. Robustness in the FKI system 102 is an ability to cope with errors during execution and an ability to continue to operate despite abnormalities in input, calculations, etc. The FKI system 102 addresses identification of technically and functionally acceptable FKs to form PK-FK pairs that correctly provide the end user with accurate results.

Figure 2:
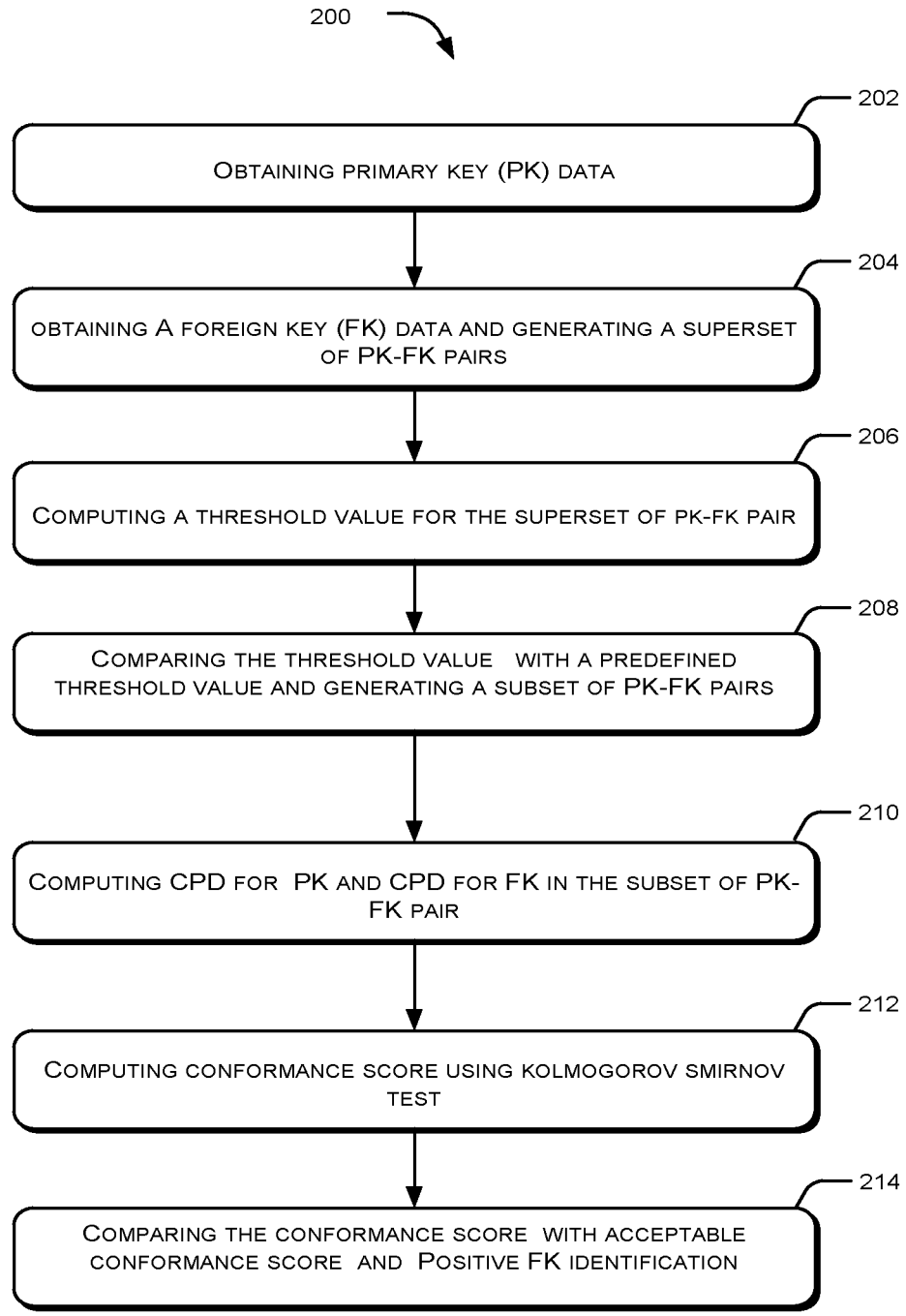
FIG. 2 illustrates a method for foreign key identification, in accordance with an implementation of the present subject matter.

FIG. 2 illustrates a method 200 for identifying an FK, in accordance to an embodiment of the present subject matter. The method 200 is implemented in a computing device, such as the FKI system 102. The method may be described in the general context of computer executable instructions. Generally, computer executable instructions can include routines, programs, objects, components, data structures, procedures, modules, functions, etc., that perform particular functions or implement particular abstract data types. The method may also be practiced in a distributed computing environment where functions are performed by remote processing devices that are linked through a communications network.

The order in which the method is described is not intended to be construed as a limitation, and any number of the described method blocks can be combined in any order to implement the method, or an alternative method. Additionally, individual blocks may be deleted from the method without departing from the spirit and scope of the subject matter described herein. Furthermore, the method can be implemented in any suitable hardware, software, firmware, or combination thereof.

As illustrated in block 202, PK data is obtained. In one example, the selection module 118 within the FKI system 102 is configured to obtain the primary key data in the database server 106 and stores the data in the selected data 126.

As illustrated in block 204, FK data is obtained and a superset of PK-FK pairs is created using the obtained FK data and the PK data. In one example, the selection module 118 is configured to obtain the foreign key data corresponding to the primary key data in the database server 106. In an implementation, the selection module 118 stores the primary key data, the foreign key data, and relational data as superset PK-FK pairs for further assessment in the selected data 126.

As illustrated in block 206, a threshold value is computed for the superset of PK-FK pairs. In one example, the computational module 120 within the FKI system 102 receives the superset of PK-FK pairs from the selected data 126. In one implementation, the computational module 120 computes a threshold value for the superset of PK-FK pairs. The data computed by computational module 120 is stored in the computed data 128 for further evaluation.

As illustrated in block 208, a predefined threshold value is compared to the computed threshold value and a subset of PK-FK pairs is obtained. In one example, the evaluation module 122 within the FKI system 102 receives the computed threshold value for the superset of PK-FK pairs from the computed data 128 and compares it to a predefined value to obtain a subset of PK-FK pairs. The subset is stored in the evaluated data 130 for further computation.

As illustrated in block 210, CPD is computed for all the PKs and the FKs in the subset of the PK-FK pairs. In one example, the computational module 120 within the FKI system 102 receives the PK data and the FK data in the subset of PK-FK pairs from the evaluated data 130 and computes the CPD for all the PKs and the CPD for all the FKs as explained earlier and is stored in the computed data 128.

As illustrated in block 212, a conformance sore is computed for each PK-FK pair in the subset of PK-FK pairs using the CPD of PKs and CPD of FKs. In one example, the computational module 120 within the FKI system 102 is further configured to compute the conformance score as described earlier, for each of PK-FK pair from the CPD data of PKs and FKs received from the computed data 128. The conformance score computed is further stored in the computed data 128.

As illustrated in block 214, computed conformance score is compared to a predefined acceptable conference score to obtain a positive FK identification to pair with the obtained PK to form a positive PK-FK pair. In one example, the evaluation module compares the conformance score received from the computed data 128 to the predefined accepted conformance score and identifies an FK to form a positive PK-FK pair. The identified FK is further stored in the evaluated data 130 to be presented in a report or a graphical format using the interface 110.

Although embodiments for foreign key identification in database management systems have been described in language specific to structural features and/or methods, it is to be understood that the invention is not necessarily limited to the specific features or methods described. Rather, the specific features and methods are disclosed as exemplary embodiments for the foreign key identification in database management systems.

We claim:

1. A computer implemented method for foreign key (FK) identification in a databases management system, the method comprising:

obtaining a superset of primary key-foreign key (PK-FK) pairs based on a selected schema of a metadata, wherein FK associated with the superset of PK-FK pairs is based on a predefined standard rule and wherein PK associated with the superset of PK-FK pairs is based on a user query, wherein the selected schema comprises one of a structure of a database server described in a formal language supported by DBMS, organization of data to create a blueprint of constructional details of the database server and data that can be received as an input into the database server;

computing a threshold value for each of a primary key-foreign key (PK-FK) pair of a superset of PK-FK, wherein the threshold value is based on a standard principle of FK column, and on an analysis of a data type and a length of columns of the superset of PK-FK pairs;

generating a sub-set of PK-FK pairs by comparing the computed threshold value with a predefined threshold value, wherein the subset of PK-FK pairs is a subset of the superset of PK-FK pairs, and wherein the predefined threshold value is indicative of an acceptance criterion of the PK-FK pair from the super-set of PK-FK pairs to form the sub-set of PK-FK pairs;

computing a cumulative probability distribution (CPD) for each of PK and FK values in the sub-set of PK-FK pairs based on PK and FK columns;

determining a conformance score for each of the PK-FK pair of the subset of PK-FK pairs using a statistical function based on Kolmogorov Smirnov Test, wherein the conformance score is the maximum difference between computed corresponding Cumulative Probability Distribution (CPD) values of PK and CPD of FK for each PK-FK pair of the sub-set of PK-FK pairs and wherein the conformance score is computed with respect to a range and a variation for the sub-set of PK-FK pairs; and comparing the conformance score of the each PK-FK pair of the sub-set of PK-FK pairs with a predetermined acceptability index to identify an FK to form a positive PK-FK pair, wherein the predetermined acceptability index is indicative of an acceptance of at least one positive FK from the set of PK-FK pairs.

2. The method as claimed in claim 1, wherein the method further comprises identification of FK to form a positive PK-FK pair based on the comparison between the conformance score of the each PK-FK pair of the sub-set of PK-FK pairs with and the predetermined acceptability index.

3. The method as claimed in claim 1, wherein the number of rows of the FK columns is greater than the number of distinct rows of the PK columns.

4. A foreign key identification (FKI) system for identifying a foreign Key comprising:
a processor;
a selection module coupled to the processor, configured to obtain a superset of primary key-foreign key (PK-FK) pairs based on a selected schema of a metadata, wherein FK associated with the superset of PK-FK pairs is based on a predefined standard rule and wherein PK associated with the superset of PK-FK pairs is based on a user query, wherein the selected schema comprises one of a structure of a database server described in a formal language supported by DBMS, organization of data to create a blueprint of constructional details of the database server and data that can be received as an input into the database server;
a computational module coupled to the processor, configured to compute a threshold value of a Primary key-foreign key (PK-FK) pair of a super-set of PK-FK, wherein the threshold value is based on a standard principle of FK column and on an analysis of a data type and a length of columns of the superset of PK-FK pairs; and
an evaluation module coupled to the processor, configured to generate a sub-set of PK-FK pairs by comparing the computed threshold value with a predefined threshold value, wherein the subset of PK-FK pairs is a subset of a superset of PK-FK pairs, and wherein the predefined threshold value is indicative of an acceptance criterion of the PK-FK pair from the super-set of PK-FK pairs to form the sub-set of PK-FK pairs,
wherein the computational module coupled to the processor, is further configured to:
compute a cumulative probability distribution for each of PK and FK values in the sub-set of PK-FK pairs based on PK and FK columns;
determine a conformance score for each of the PK-FK pair of the subset of PK-FK pairs using a statistical function based on Kolmogorov Smirnov Test, wherein the conformance score is the maximum difference between computed corresponding Cumulative Probability Distribution (CPD) values of PK and CPD of FK for each PK-FK pair of the sub-set of PK-FK pairs and wherein the conformance score is computed with respect to a range and a variation for the sub-set of PK-FK pairs; and
wherein the evaluation module is further configured to compare the conformance score of the each PK-FK pair of the sub-set of PK-FK pairs with a predetermined acceptability index to identify an FK to form a positive PK-FK pair, wherein the predetermined acceptability index is indicative of an acceptance of at least one positive FK from the set of PK-FK pairs.

5. The FKI system as claimed in claim 4, wherein the evaluation module is further configured to identify FK to form a positive PK-FK pair based on the comparison between the conformance score of the each PK-FK pair of the sub-set of PK-FK pairs with and the predetermined acceptability index.

6. The FKI system as claimed in claim 4, wherein the number of rows of the FK columns is greater than the number of distinct roes in the primary rows of the PK columns.

7. A non-transitory computer-readable medium having embodied thereon a computer readable program code for executing a method, the method comprising:
obtaining a superset of primary key-foreign key (PK-FK) pairs based on a selected schema of a metadata, wherein FK associated with the superset of PK-FK pairs is based on a predefined standard rule and wherein PK associated with the superset of PK-FK pairs is based on a user query, wherein the selected schema comprises one of a structure of a database server described in a formal language supported by DBMS, organization of data to create a blueprint of constructional details of the database server and data that can be received as an input into the database server;
computing a threshold value of a Primary key-foreign key (PK-FK) pair of a super-set of PK-FK where in the threshold value is based on a standard principle of FK column and on analysis of a data type and a length of columns of the superset of PK-FK pairs;
generating a sub-set of PK-FK pairs by comparing the computed threshold value with a predefined threshold value, wherein the subset of PK-FK pairs is a subset of a superset of PK-FK pairs and wherein the predefined threshold value is indicative of an acceptance criterion of the PK-FK pair from the super-set of PK-FK pairs to form the sub-set of PK-FK pairs;
computing a cumulative probability distribution for each of PK and FK values in the sub-set of PK-FK pairs based on PK and FK columns;
determining a conformance score for each of the PK-FK pair of the subset of PK-FK pairs using a statistical function based on Kolmogorov Smirnov Test, wherein the conformance score is the maximum difference between computed corresponding Cumulative Probability Distribution (CPD) values of PK and CPD of FK for each PK-FK pair of the sub-set of PK-FK pairs and wherein the conformance score is computed with respect to a range and a variation for the sub-set of PK-FK pairs;
comparing the conformance score of the each PK-FK pair of the sub-set of PK-FK pairs with a predetermined acceptability index to identify an FK to form a positive PK-FK pair, wherein the predetermined acceptability index is indicative of an acceptance of at least one positive FK from the set of PK-FK pairs; and
identifying FK to form a positive PK-FK pair based on the comparison between the conformance score of the each PK-FK pair of the sub-set of PK-FK pairs with and the predetermined acceptability index.

* * * * *